UNITED STATES PATENT OFFICE.

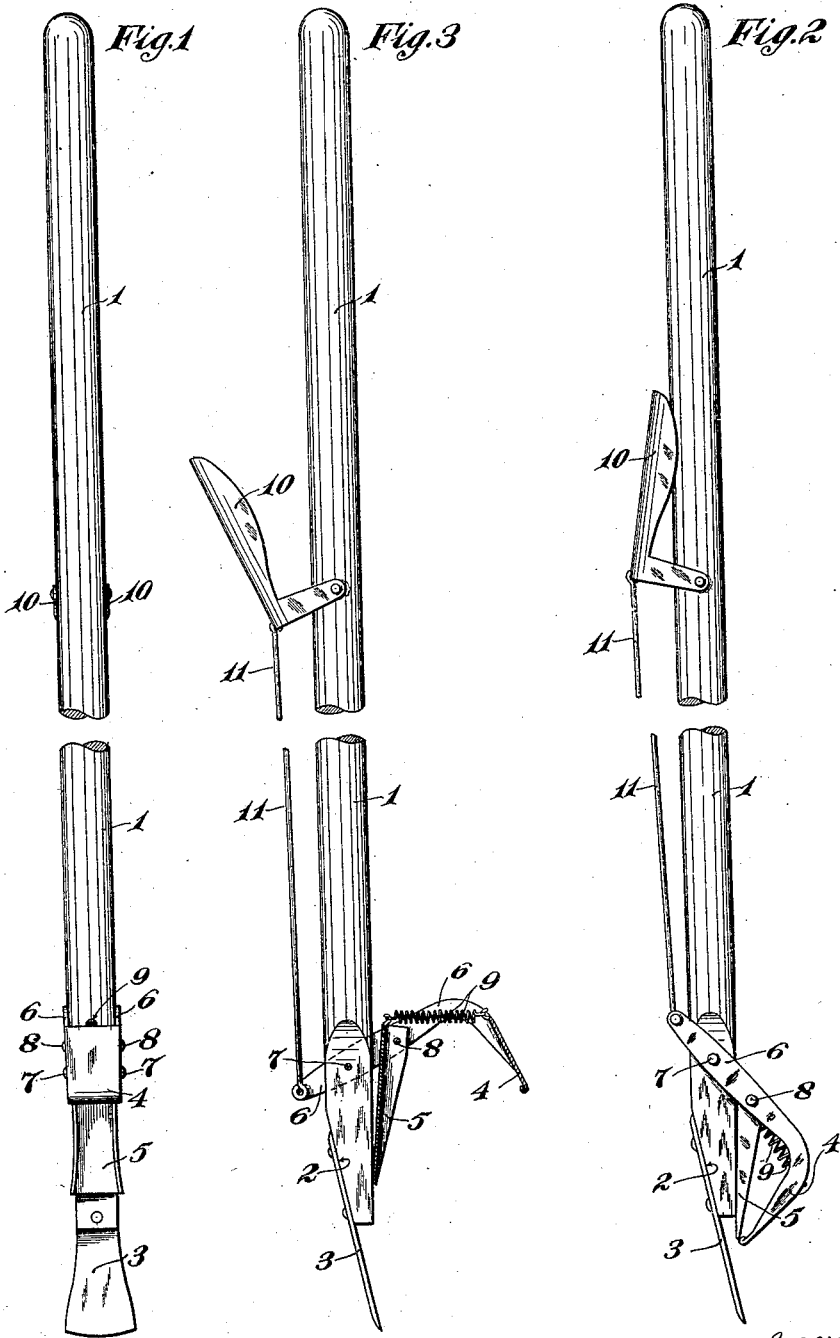

BURTON SCHNEIDER, OF MINNEAPOLIS, MINNESOTA.

DANDELION-DIGGER.

No. 917,802.　　　Specification of Letters Patent.　　　Patented April 13, 1909.

Application filed July 16, 1908. Serial No. 443,820.

*To all whom it may concern:*

Be it known that I, BURTON SCHNEIDER, a citizen of the United States, residing at Minneapolis, in the county of Hennepin and State of Minnesota, have invented certain new and useful Improvements in Dandelion-Diggers; and I do hereby declare the following to be a full, clear, and exact description of the invention, such as will enable others skilled in the art to which it appertains to make and use the same.

My invention has for its object to provide a simple and efficient device for digging and picking up dandelions and other weeds that grow in lawns, and to this end it consists of the novel devices and combinations of devices hereinafter described and defined in the claims.

The improved device is illustrated in the accompanying drawings, wherein like characters indicate like parts throughout the several views.

Referring to the drawings, Figure 1 is a view in front elevation, showing the improved device. Fig. 2 is a side elevation of the same; and Fig. 3 is a side elevation of the device, with some parts shown in section.

The improved device comprises a quite long handle or pole 1, the lower end of which is preferably beveled at 2, and to which beveled portion is riveted or otherwise secured a downwardly projecting chisel blade 3, preferably the lower edge of which is sharpened and preferably hardened, the said blade being made of steel.

The numerals 4 and 5 indicate a pair of jaws, the former of which has laterally spaced arms 6 that embrace the lower end of the pole 1 and are pivotally connected thereto at 7. The jaw 5 is embraced by and is pivotally connected at 8 to the arms 6 of the jaw 4, and the two jaws are connected, by a coiled spring 9, the tension of which tends to open up the two jaws, as shown in Fig. 3. Also this spring 9 keeps the lower edge of the jaw 5 forced against the lower end of the pole 1, and as the line of strain of said spring is always outward of the pivot 8, it tends to force the jaw 4 upward and outward. Otherwise stated, the coiled spring 9 tends to force the two jaws apart and to move the same upward into the position shown in Fig. 3.

A hand lever 10 which is pivotally connected to the upper portion of the pole 1 is connected, by a rod 11, to the free ends of the arms 6. When the said lever 10 is forced against the pole, as shown in Fig. 2, the two jaws are moved downward and forced together, as shown in said Fig. 2.

The use of the device is as follows: The blade 3 being placed close to the root of the dandelion or weed to be dug up, is forced at a slight inclination in respect to a vertical into the ground until the lower end of the pole strikes the ground and limits further downward movement. Then by pressing the latch lever 10 against the pole the two jaws 4 and 5 are caused to move bodily downward and to close onto that portion of a dandelion plant or weed that is above the ground. Then when the jaws are held closed, the blade is withdrawn from the ground and the plant or weed is picked up by the closed jaws. This, as is evident, may be easily accomplished while the person using the device stands in an erect position. The digging up of dandelions and weeds is, therefore, made an easy matter and, furthermore, the roots will be cut out so that they will not again grow. In other words, the entire plant is uprooted and removed from the ground.

The device described is of small cost and in actual practice has been found highly efficient for the purposes had in view.

What I claim is:

1. In a device of the kind described, the combination with a pole and a blade secured to the lower end thereof, of a pair of jaws mounted to move pivotally in respect to each other and to move downward in respect to said pole to pick up a plant or weed, the root of which has been cut by said blade, substantially as described.

2. In a device of the kind described, the combination with a pole and a chisel-like blade secured to the lower end thereof, of a pair of pivotally connected jaws, one of which is pivotally connected to the lower end of said pole, yielding means tending to open said jaws and to move the same upward in respect to the pole, and a hand-piece applied to the upper portion of said pole and connected to the jaw which is pivoted to said pole, substantially as described.

3. In a device of the kind described, the combination with a pole and chisel-like blade secured to the lower end thereof, and the lower end of which pole serves as a stop to limit the insertion of said blade into the ground, of a jaw having a pair of arms embracing and pivotally connected to the lower end of said pole, another jaw pivotally connected to the arms of said first noted jaw, a spring connecting said two jaws and tending to move the same apart and bodily upward on the pole, a hand lever pivoted to the upper portion of said pole, and a rod connecting said hand lever to the arms of said arm-equipped jaw, substantially as described.

In testimony whereof I affix my signature in presence of two witnesses.

BURTON SCHNEIDER.

Witnesses:
   H. D. KILGORE,
   F. D. MERCHANT.